United States Patent [19]
Wood

[11] Patent Number: 5,747,700
[45] Date of Patent: May 5, 1998

[54] PORTABLE ELECTRONIC FLOW METER

[76] Inventor: Robert Wood, 396 Raven Hill, Ottawa, Ontario, Canada, K2A 0J6

[21] Appl. No.: 736,332

[22] Filed: Oct. 23, 1996

[51] Int. Cl.⁶ ...................................................... G01F 1/58
[52] U.S. Cl. ...................................... 73/861.12; 73/181
[58] Field of Search ............................ 73/861.12, 0.08, 73/0.11, 0.13, 181, 861.16, 861.17; 324/156

[56] References Cited

U.S. PATENT DOCUMENTS

| | | | |
|---|---|---|---|
| 3,677,082 | 7/1972 | Springston, Jr. et al. | 73/181 |
| 3,898,881 | 8/1975 | Darby, Jr. | 73/181 |
| 4,259,635 | 3/1981 | Triplett | 324/156 |
| 4,262,542 | 4/1981 | Freund, Jr. et al. | 73/861.12 |
| 4,472,966 | 9/1984 | Dumestre, III | 73/181 |
| 4,727,754 | 3/1988 | Ruckel | 73/861.12 |
| 4,848,146 | 7/1989 | Bruno et al. | 73/181 |
| 5,063,786 | 11/1991 | Sanderson et al. | 73/861.19 |
| 5,327,787 | 7/1994 | Kiene et al. | 73/861.12 |
| 5,357,794 | 10/1994 | Nielsen | 73/181 |
| 5,388,465 | 2/1995 | Okaniwa et al. | 73/861.12 |

*Primary Examiner*—George M. Dombroske
*Assistant Examiner*—Harshad Patel
*Attorney, Agent, or Firm*—Neil Teitelbaum & Associates

[57] ABSTRACT

A flow meter for use in scuba diving is disclosed. The device has a coil or, alternatively, two coils separated by a predetermined distance and sensors for measuring induced electromotive force. The device is provided with a switch to enable it to be activated. The switch also acts to disable the device and allow compass operation. An embodiment of the device including a compass and a processor allows for navigation functions to be performed.

19 Claims, 13 Drawing Sheets

PORTABLE ELECTRONIC FLOW METER

FIELD OF THE INVENTION

This invention relates generally to fluid flow measurement and more particularly relates to a portable device for measuring water flow for use in scuba diving and navigation.

BACKGROUND OF THE INVENTION

Scuba diving has become a very popular sport. In scuba diving an individuals goes on a dive—submersing themselves under water for a period of time. Some dives originate and end at a same location. This is often the case when diving from a boat or a dock. Other dives originate in a first location and end in a second different location. In either case, navigation is very important in order to locate the end location for a dive.

Once under the water, it is difficult to detect motion absent a fixed landmark such as a sea bed or a coral reef. Divers detect motion relative to the water in which they are immersed. When diving in a river or in a significant current, a diver perceives no motion when moving at the current's speed. Further, a diver's compass makes no indication of drift due to current unless the diver's orientation is forced to change.

Electronic flow meters are known for use in boats. A family of devices is taught by Freund, Jr. et al. in U.S. Pat. No. 4,262,542. The devices operate from a DC power source and generate pulses to drive two coils. Electrodes disposed within the device detect an induced magnetic field to determine fluid flow. Various electronic circuitry is used to amplify the induced magnetic field and measure it. The use of such a configuration allows variations in size and other factors to provide a family of flow meters for measuring fluid flow through tubes or pipes. The use of a regularly pulsing (clocked) flow meter as described in U.S. Pat. No. 4,262,542 interferes with the use of a compass in close proximity due to magnetic field interference.

A further electromagnetic flow meter is taught by Ruckel in U.S. Pat. No. 4,727,754. The device uses a magnetic core with wire windings. Such a magnetic core would interfere with a compass used in close proximity.

OBJECT OF THE INVENTION

It is an object of this invention to provide a means of determining current speed for scuba divers that does not interfere with compasses or other scuba diving equipment.

It is an object of this invention to provide a means of determining an approximate direction of travel.

It is an object of the invention to provide a means of determining a distance traveled.

SUMMARY OF THE INVENTION

In accordance with the invention there is provided a portable device for measuring fluid flow and for assisting navigation of a diver, comprising:

a) a waterproof housing;

b) a DC power supply for providing power to the device disposed within the housing;

c) a coil disposed within the housing to allow fluid outside the housing to flow proximate the coil on at least a side thereof;

d) a switch for providing DC power from the power supply to the coil, in a first mode of operation, and for preventing DC power from being supplied to the coil, in a second mode of operation;

e) a first conducting sensor and a second conducting sensor disposed outside the housing for sensing electromagnetic fields within fluid passing outside the housing proximate the coil and for providing a first signal and a second signal, respectively, corresponding to sensed electromagnetic fields;

f) measuring means coupled to receive the first signal and the second signal and for determining a measurement of fluid flow rate in dependence upon at least an aspect of the first signal and the second signal and for providing a third signal in dependence upon the measurement; and g) display means for displaying information indicative of fluid flow rate in dependence upon the third signal.

In accordance with the invention there is further provided a portable device for measuring fluid flow and for assisting navigation of a diver comprising:

a) a substantially waterproof housing having a handle portion and a tube portion having an aft end and a fore end in fluid communications, the tube portion for accepting fluid at the fore end thereof and for allowing the fluid to pass through the tube portion and exit at an aft end thereof;

b) a DC power supply disposed within the housing and for providing power to the device;

c) a pair of coils disposed on different sides of the tube portion of the housing between the aft end and the fore end thereof for allowing fluid outside the housing to pass therebetween;

d) a switch for providing power from the power supply to the pair of coils in a first mode of operation and for preventing power from being supplied to the pair of coils in a second mode of operation;

e) a first conducting sensor and a second conducting sensor disposed outside the housing for sensing electromagnetic fields within fluid passing outside the housing proximate the coils and for providing a first signal and a second signal, respectively, corresponding to sensed electromagnetic fields;

f) measuring means coupled to receive the first signal and the second signal and for determining a measurement of fluid flow rate in dependence upon at least an aspect of the first and second signals and for providing a third signal in dependence upon the measurement; and g) display means for displaying information indicative of fluid flow rate in dependence upon the third signal.

The advantages of a system in accordance with this invention are numerous. For example, measuring water flow helps in navigation divers and can be performed while allowing regular compass use.

BRIEF DESCRIPTION OF THE DRAWINGS

An exemplary embodiment of the invention will now be discussed in conjunction with the attached drawings in which.

DETAILED DESCRIPTION

Figure 1:
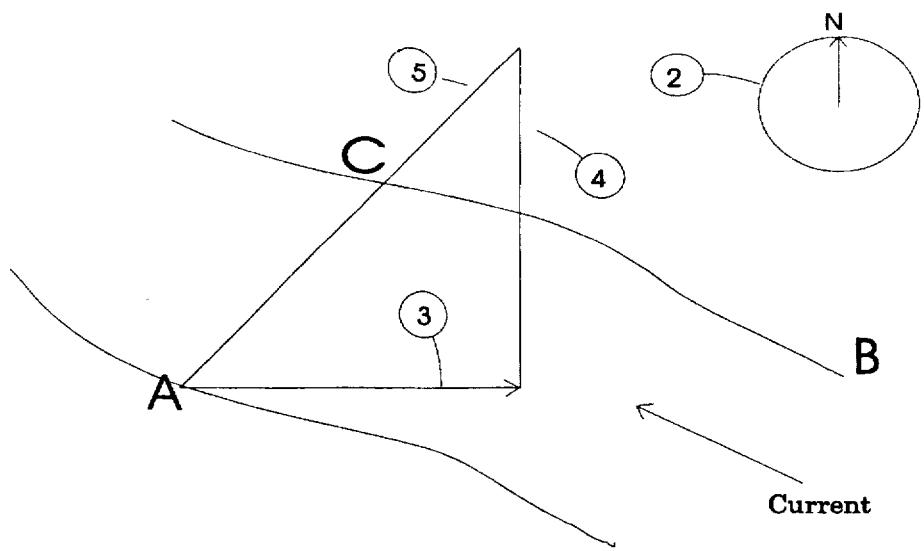
FIG. 1 is a simplified diagram illustrating a problem faced by swimmers and divers.

A typical problem is illustrated in FIG. 1. A diver wishes to traverse from point A to point B on opposite banks of a river. Standing at point A, the diver establishes that point B is due east (as shown on the compass 2). The diver gets into the water and using a compass, proceeds due east. Unfortunately, while swimming, the river current sweeps the diver downstream causing the diver to exit the river at point C far downstream of an intended exit point. A vector representing the diver's speed 3 and a vector representing the river current 4 are summed to form a vector representing the diver's actual speed and direction 5.

Generally a diver estimates a best guess for a course to swim in order to traverse from point A to point B. The diver swims in that direction hoping to end up upstream of the desired exit point. The diver then is able to drift downstream with little effort in order to exit at a desired location. It would be advantageous for a diver to measure current flow and diver swim speed in order to better estimate a course to swim. Devices for measuring fluid flow, as are available for use in marine or factory applications, are impractical due to size, power consumption, and due to interference with compass operation.

Figure 2:
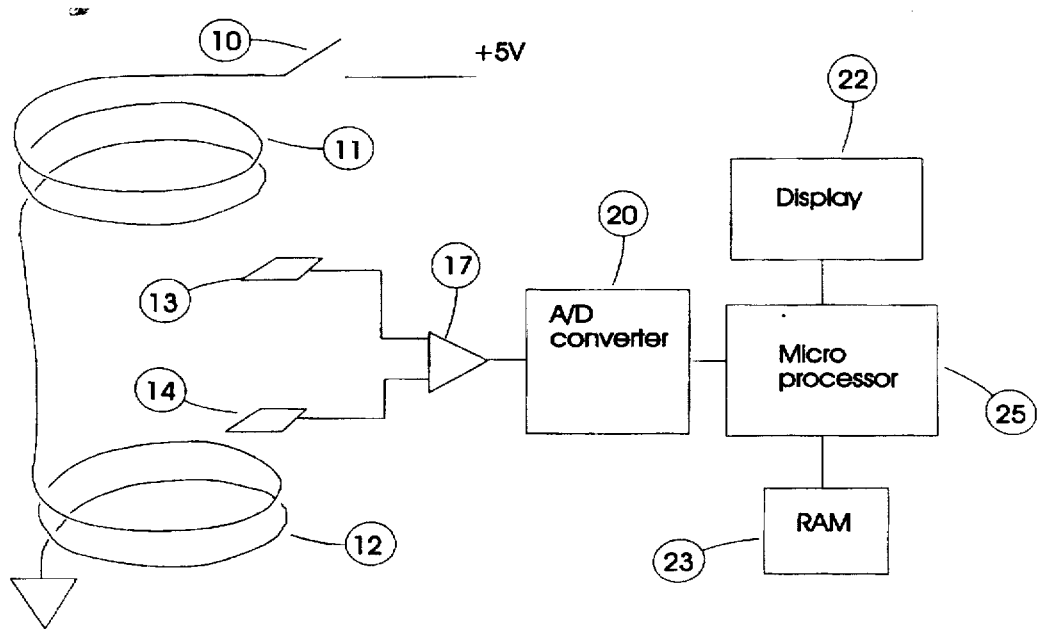
FIG. 2 is a schematic block diagram of a flow meter according to an aspect of the present invention.

A schematic of an embodiment of the invention is shown in FIG. 2. A flow meter for use in scuba diving is portable, sealed, and has no moving parts (other than switches 10). The device comprises two coils 11 and 12 connected in series and two sensing plates 13 and 14. The coils are connected from a power supply to ground, the connection inducing current in the coils thereby inducing a magnetic field. Optionally, other components may be placed in series with the coils to control current or filter the DC signal. The sensing plates 13 and 14 are connected to an amplifier 17 and an amplified signal is digitized by an analogue to digital conversion circuit 20 and provided to a processor 22. The processor 22 is a simple micro-controller. Alternatively, the processor is a microprocessor. The processor in conjunction with memory means 23 converts the digitized amplified signal into predetermined units of measure and drives a display means 25 in order to provide a visual indication of the fluid flow rate.

In use, the device is placed in water and the magnetic field is induced in the water. As water is generally conductive (as found in lakes, rivers, . . .), and forms a moving conductor through a magnetic field. A predetermined distance away, the sensor plates 13 and 14 measure induced electromotive force to determine the flow rate of the water. The amplifier 17 amplifies a difference between the sensed electric fields and provides an amplified difference to the analogue to digital converter 20. A digitized value for the amplified difference is provided to the processor 22 which transforms the digitized value into a measure of fluid flow. Generally, the transformation is in the form of a unit conversion from voltage difference to feet/second or meters/second. The conversion requires a linear transform in the form of 1 volt difference=n knots. Alternatively, the relationship between voltage and flow rate is non-linear. Alternatively to a transform, a look up table can be used to map measured voltages onto flow rates.

Figure 3:
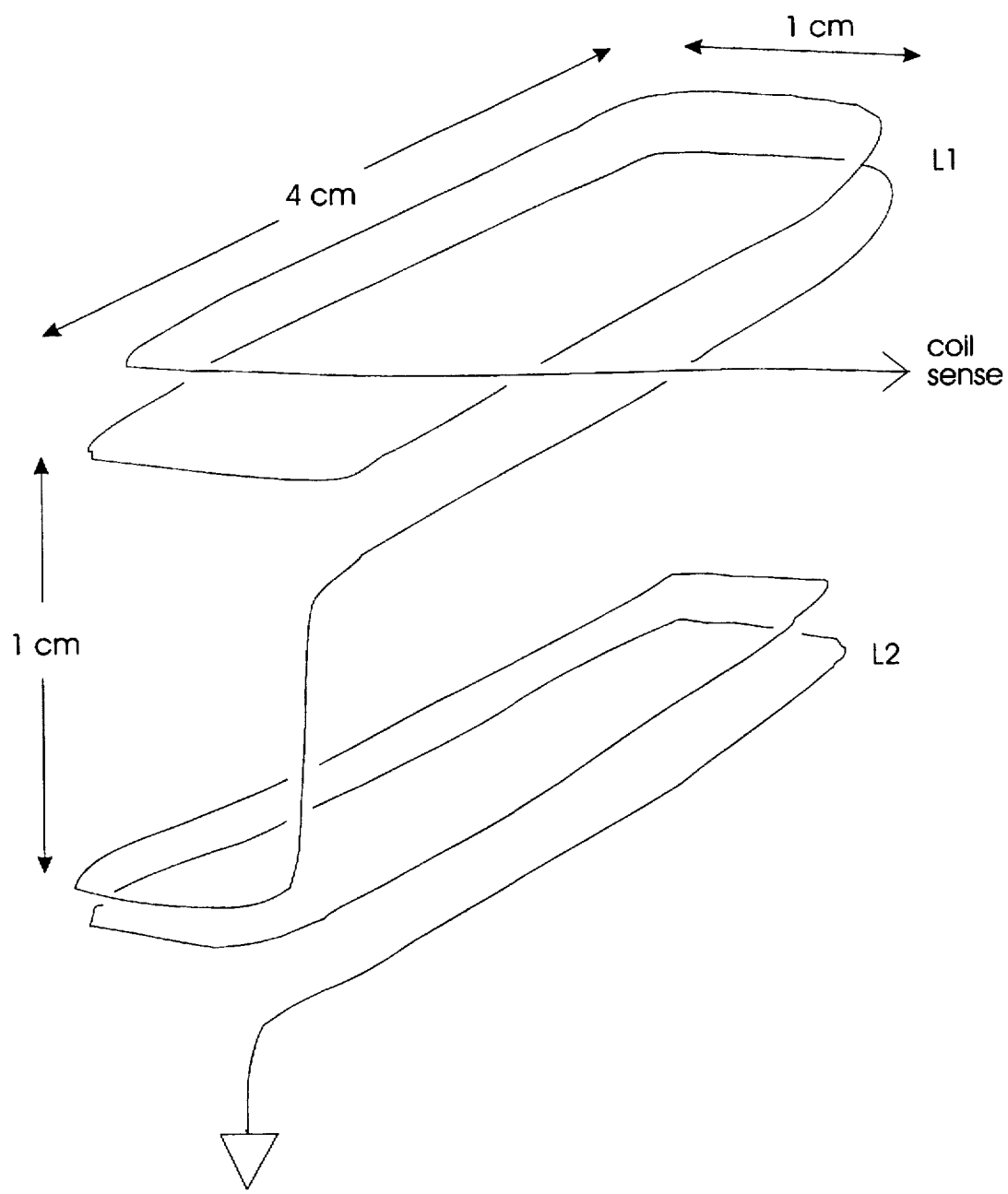
FIG. 3 is a detailed drawing of a coil configuration for use in the present invention.

Referring to FIG. 3, an embodiment of a coil construction in accordance with the invention, is shown. The coil is formed of enameled copper wire of a size of 36 AWG. The same physical wire is used to form both coils and the connection therebetween. Each coil is wound 185 times in a substantially rectangular loop having dimensions of, for example, 1 cm by 4 cm. The coils employed in this embodiment are symmetrical and spaced by substantially 1 cm. It is important to ensure that the gap between the coils allows for any housing desired and allows for sufficient fluid flow through an inlet in the housing and between the coils and without substantially distorting the flow. Alternatively, the wire size, length, and material may be selected to be different from those set out above. Further, the shape and dimensions may differ from those set out above.

Figure 4:
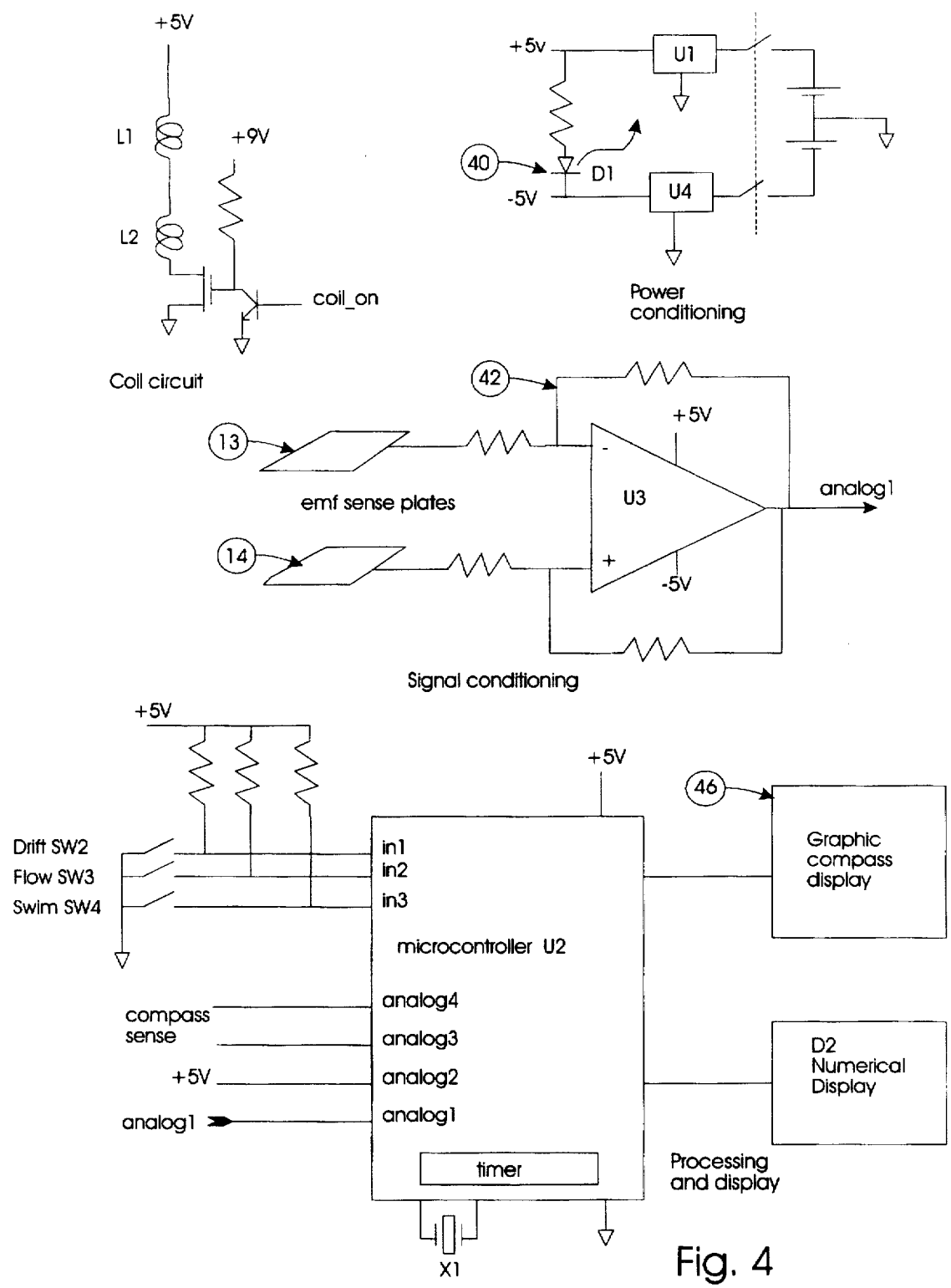
FIG. 4 is a detailed schematic of a flow meter according to an aspect of the present invention.

Referring to FIG. 4, a more detailed schematic of the circuitry of the present embodiment is shown. Reference values shown are schematic references and are different from those in other Figures. Switches SW3 and SW4 allow the magnetic field to be enabled and disabled. This provides a diver with an ability to use both a compass and a flow meter during a same dive. A power conditioning circuit 40 ensures accurate current flow to the circuit. The conditioning circuit 40 has a power switch SW1 for the apparatus in order to enable or disable power supply to the electronic circuitry. The conditioning circuit 40 also adjusts voltage and current as required. Thirdly, a sensing circuit 42 is shown. An amplifier U3 receives signals from each sensing plate 13 and 14 and amplifies a difference therebetween. A processor U2 having 2 analogue input terminals receives the amplified signal and a reference signal of, for example, +5 V. Digitizing of the signal and processing are performed and the result is output to a dual 7 segment LED D2. Alternatively the output is provided to an output means in the form of an LCD. In a further embodiment a compass (not shown) is also included in the circuit and a graphical display 46 for use therewith.

Figure 5A:
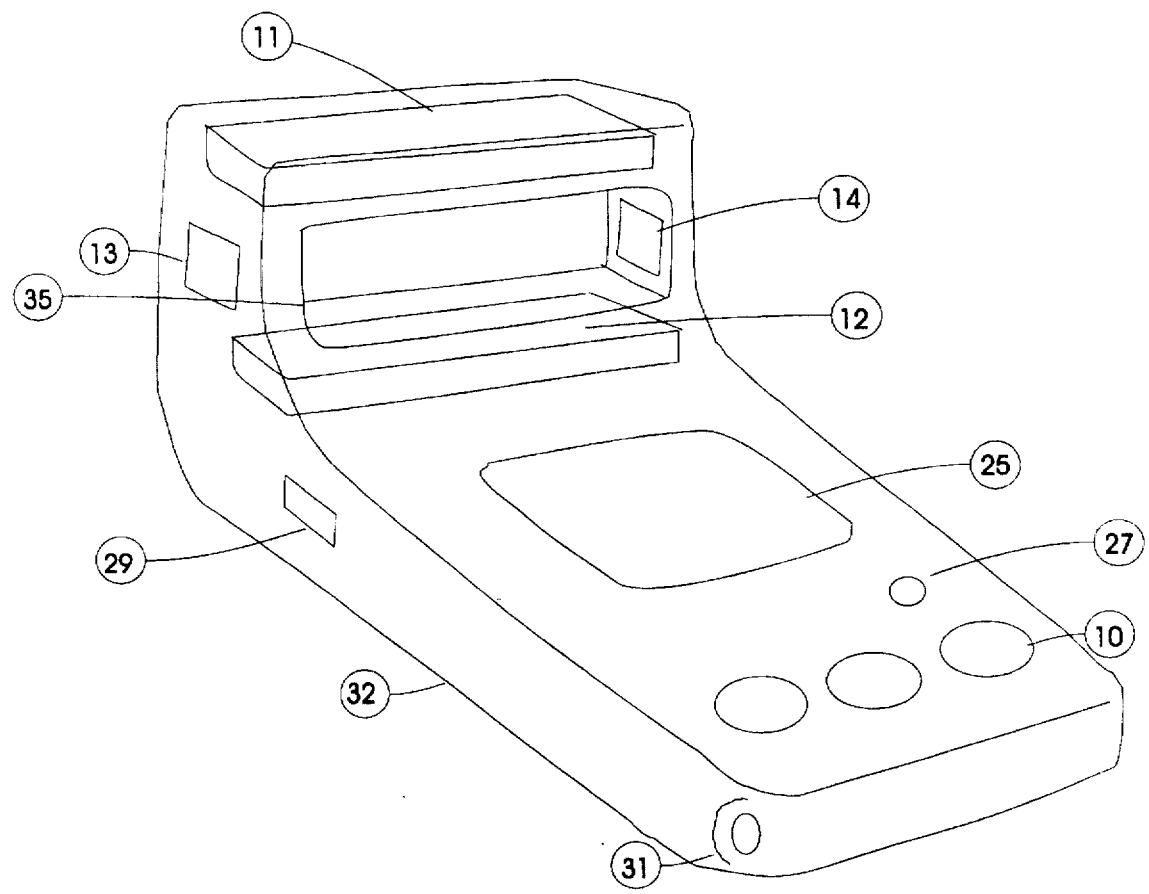
FIG. 5a is a simplified drawing of a housing for a flow meter according to the present invention.

FIG. 5a shows a housing 32 for use with the invention. The coils 11 and 12 are disposed within the housing 32 on either side of an opening 35 of substantially 1 cm×4 cm. On end sides of the opening 35 and outside the housing 32 are disposed electromagnetic sensing plates 13 and 14. In this way, the sensing plates make electrical contact with conducting fluids in the form of water during operation of the unit. An LED 27 provides a visual indication of the status of the main power switch 29. Alternatively, the visual indication is incorporated into another display means. A display means 25 is provided for displaying the fluid flow through the device and a switch 10 activates the coils. Preferably, the switch 10 only activates the coils while pressed in order not to interfere with compass operation. An attachment point 31 allows the housing to be fastened to a divers wet suit or equipment to prevent loss.

Figure 5B:
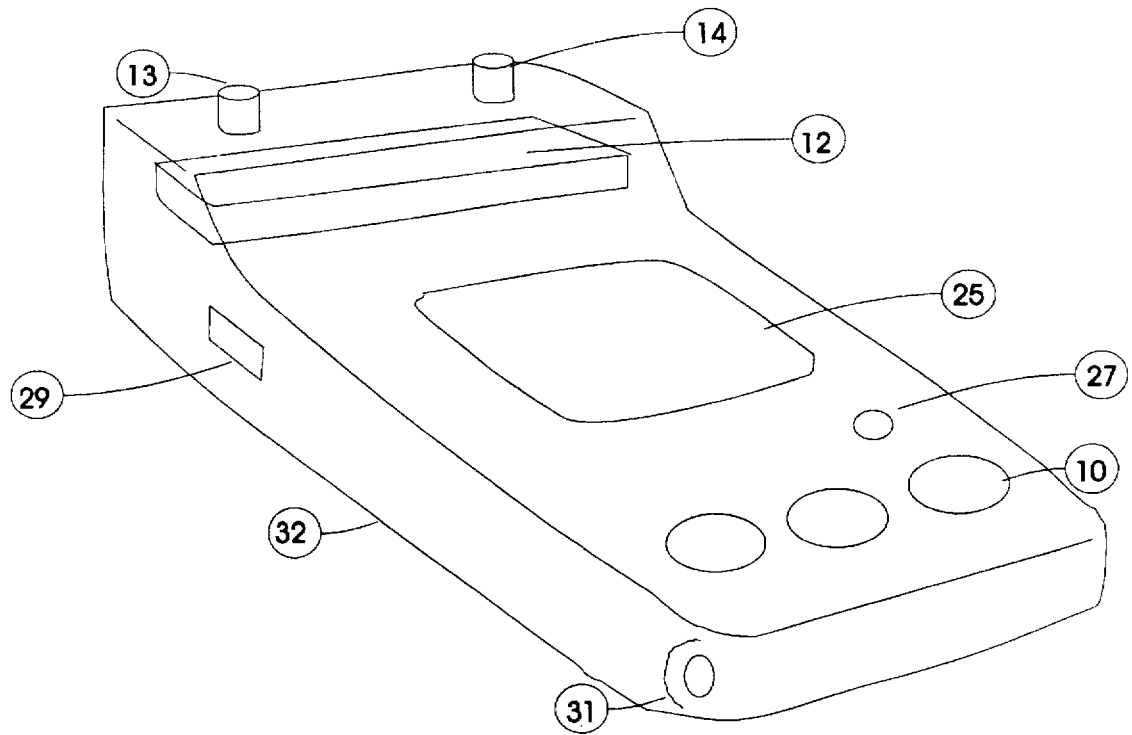
FIG. 5b is a simplified drawing of a further housing for a flow meter according to the present invention.

Alternatively, a single coil is used with two sensors as shown in FIG. 5b. The sensors 13 and 14 are disposed outside the housing 32 on either side of the coil and water is allowed to pass along at least a side of the coil 12 spaced from the coil by the housing 32. The induced voltage in each of the sensors 13 and 14 is compared to establish a measurement of fluid flow in a fashion analogous to that used with multiple coils. An advantage of the single coil embodiment is reduced interference with fluid flow and reduced cost.

Figure 6A:
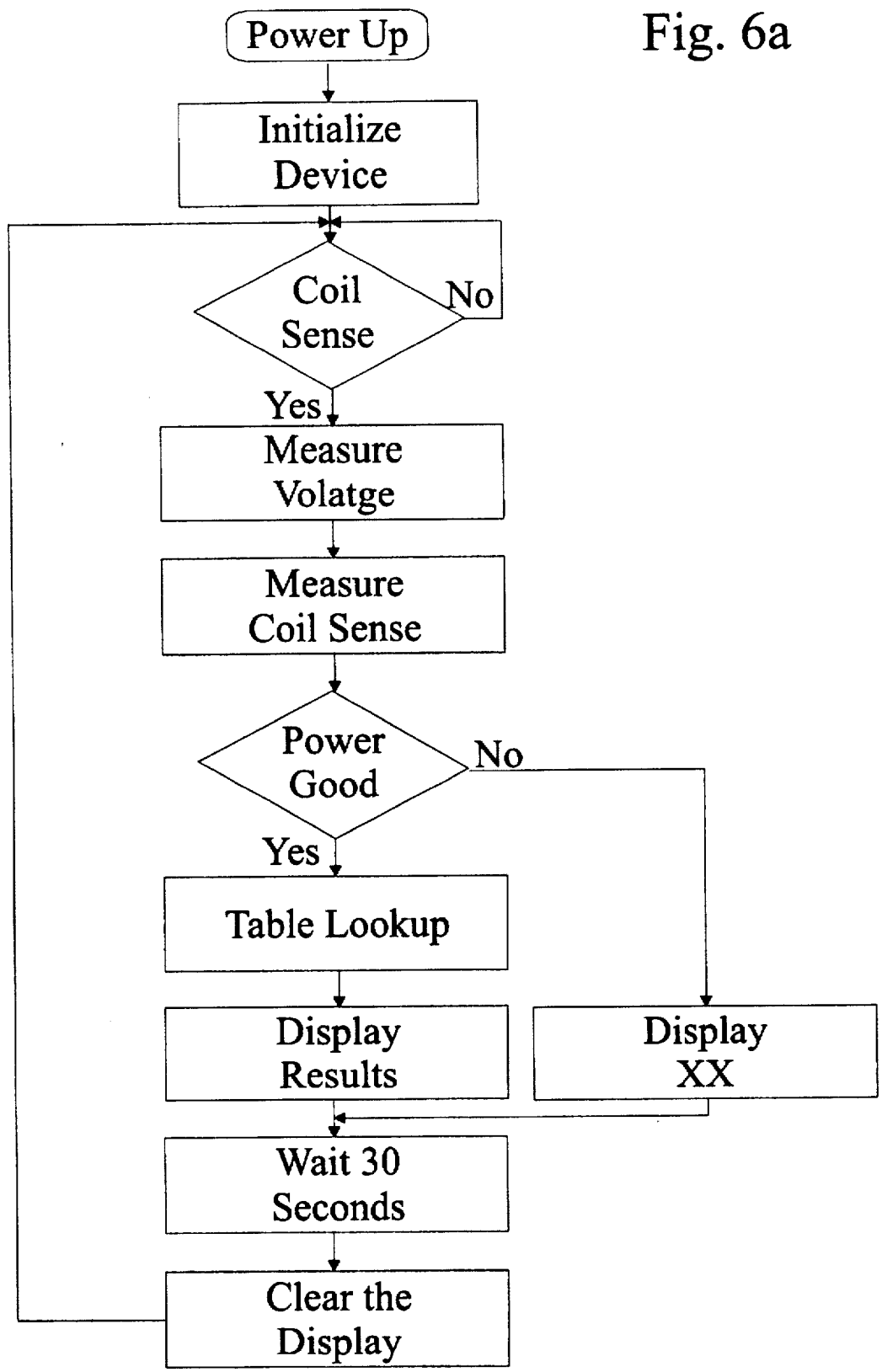
FIG. 6a is a flow diagram indicating a method of using a flow meter according to the invention.

A flow diagram for the apparatus is shown in FIG. 6a. The unit operation begins with power up. Power up is initiated by turning the switch 29 into an "On" position. Electronic circuitry is initialized. This step includes delays in power up to prevent power spiking, processor initialization, program loading, and calibration when necessary.

The processor polls "coil sense" until a voltage is present. This allows the processor to establish when the coils 11 and 12 are activated. Alternatively, another means is established for reaching that determination. Further alternatively, the coils are read whether or not they have been activated.

According to the flow diagram, when the coils have been activated (supplied with power), the amplified signal is polled to establish a digitized value of same. Once a value is present, "coil sense" is again polled to establish that power is still being provided to the coils 11 and 12. In the absence of power to the coils, the circuit assumes a boundary condition in which power to the coils was provided for a period of time within the sampling period but not for the entire period. When such is the case, the digitized signal is not considered a good measurement and the circuit displays an error—or holds the last value if one is present. When "coil sense" remains active, the digitized signal value is transformed via a look up table into an indication of fluid flow in knots. Alternatively, other units are used. The display locks with the displayed value for a period of time and then is cleared. Alternatively, during that time fluid flow measurements are made and a determination of accuracy of the measurement is made. When inaccurate, the displayed result is either adjusted accordingly or alternately, displays a low value and high value of a range of possible measurements. The device then re-enters a state of polling for coil activation.

Figure 6B:
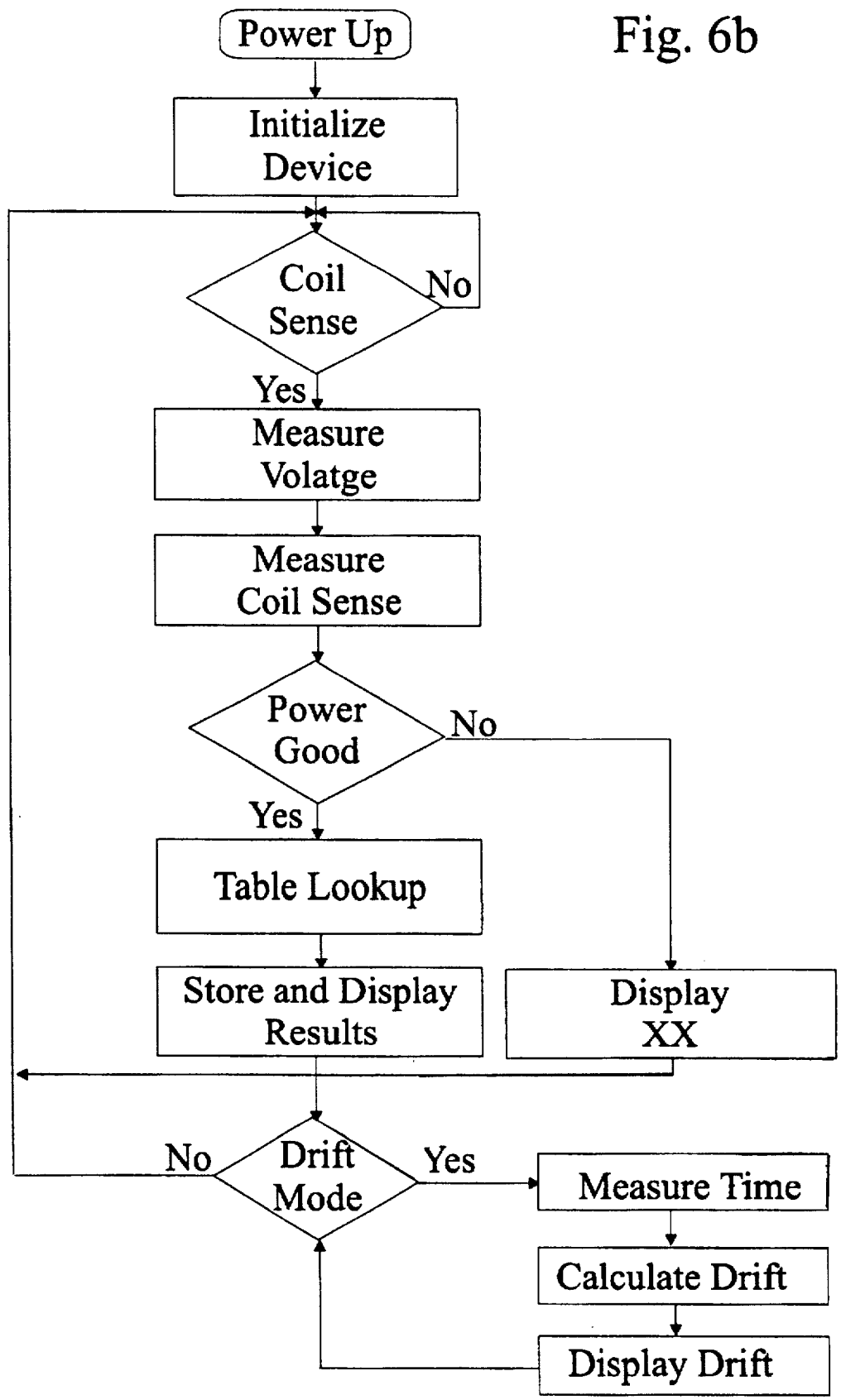
FIG. 6b is a flow diagram indicating a further mode of operation of a flow meter according to the invention.
Figure 6C:
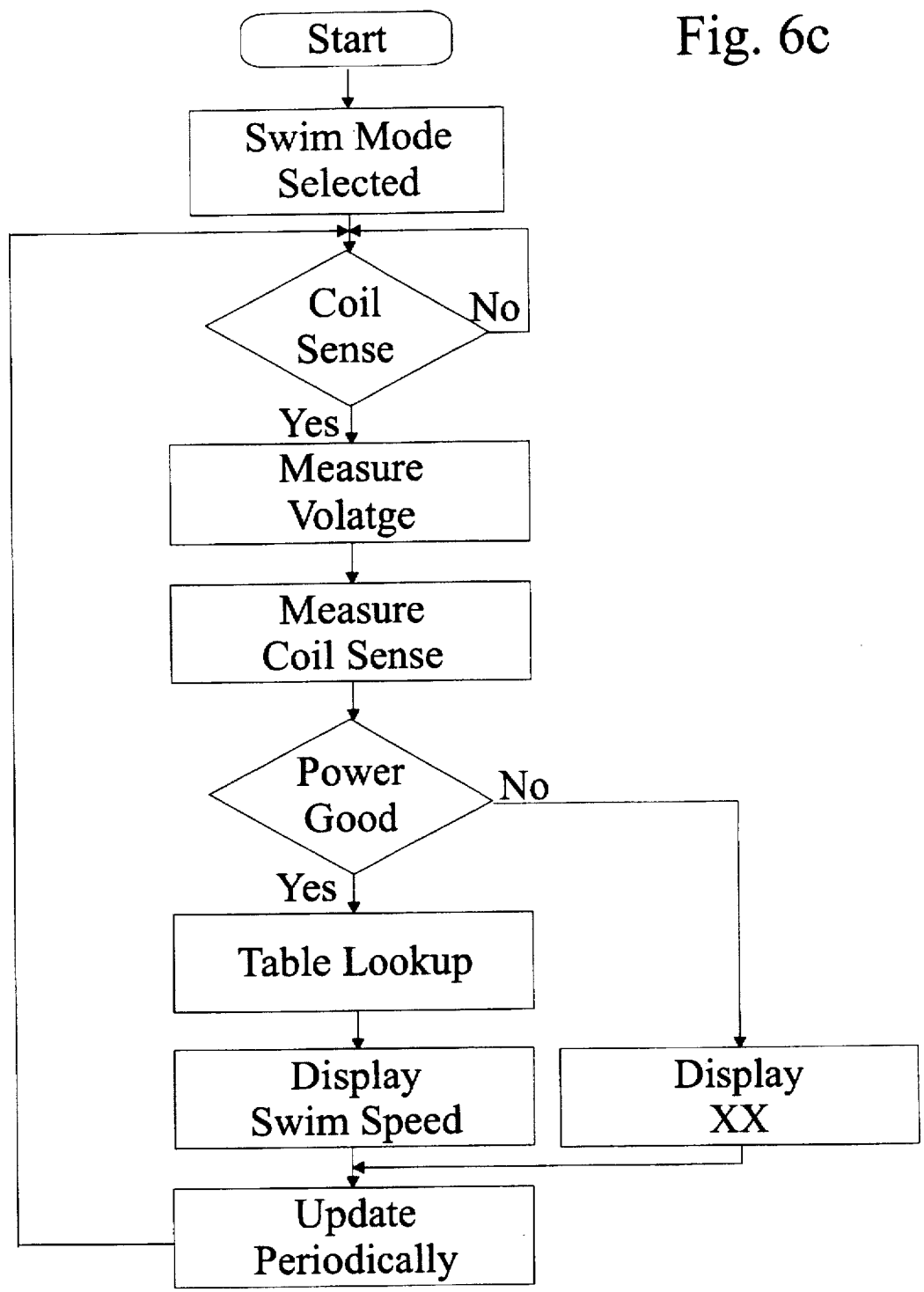
FIG. 6c is a flow diagram indicating a further mode of operation of a flow meter according to the invention.

The flow diagrams of FIG. 6b and 6c show two further modes of operation for a device as described above. A common form of diving is drift diving. In drift diving, after descending to a desired depth, a diver allows themselves to drift. This form of diving consumes less energy and, when a substantial current exists, allows a diver to travel a good distance. In a drift mode, as shown in FIG. 6b, the device measures drift of a diver. Once water current speed is measured, the device has an indication of drift speed (true drift it is equal to the current speed). A timer within a microprocessor used in the device, measures time. An indication is provided to the device that drifting is commencing. Upon conclusion, a further indication is provided. The microprocessor calculates a total drift time and multiplies the resulting value by the current speed. A drift distance is then provided to an output means. Alternatively, the drift distance provided to the output means is provided at predetermined intervals or predetermined distances. This allows for monitoring of drift distance during drifting.

In a third mode of operation and shown in FIG. 6c, a diver uses the device to measure swim speed of a diver relative to the water in which the diver is diving. As shown in the flow diagram of FIG. 6c, a diver enters the water, points the device ahead of the diver, and swims forward. The device periodically measures water flow speed. The speed water flows by the diver, is substantially equal to the diver's swim speed relative to the water and thus, results for water flow speed are indicative of diver swim speed. The operation of this mode of the device is based on same principles as the second mode of operation for the device in which it measures drift. There, the basis of a measurement of drift is that a diver while drifting does not move substantially with respect to the water current. In the third mode of operation, a diver is assumed not to move relative to the water current absent the diver swimming.

Figure 7:
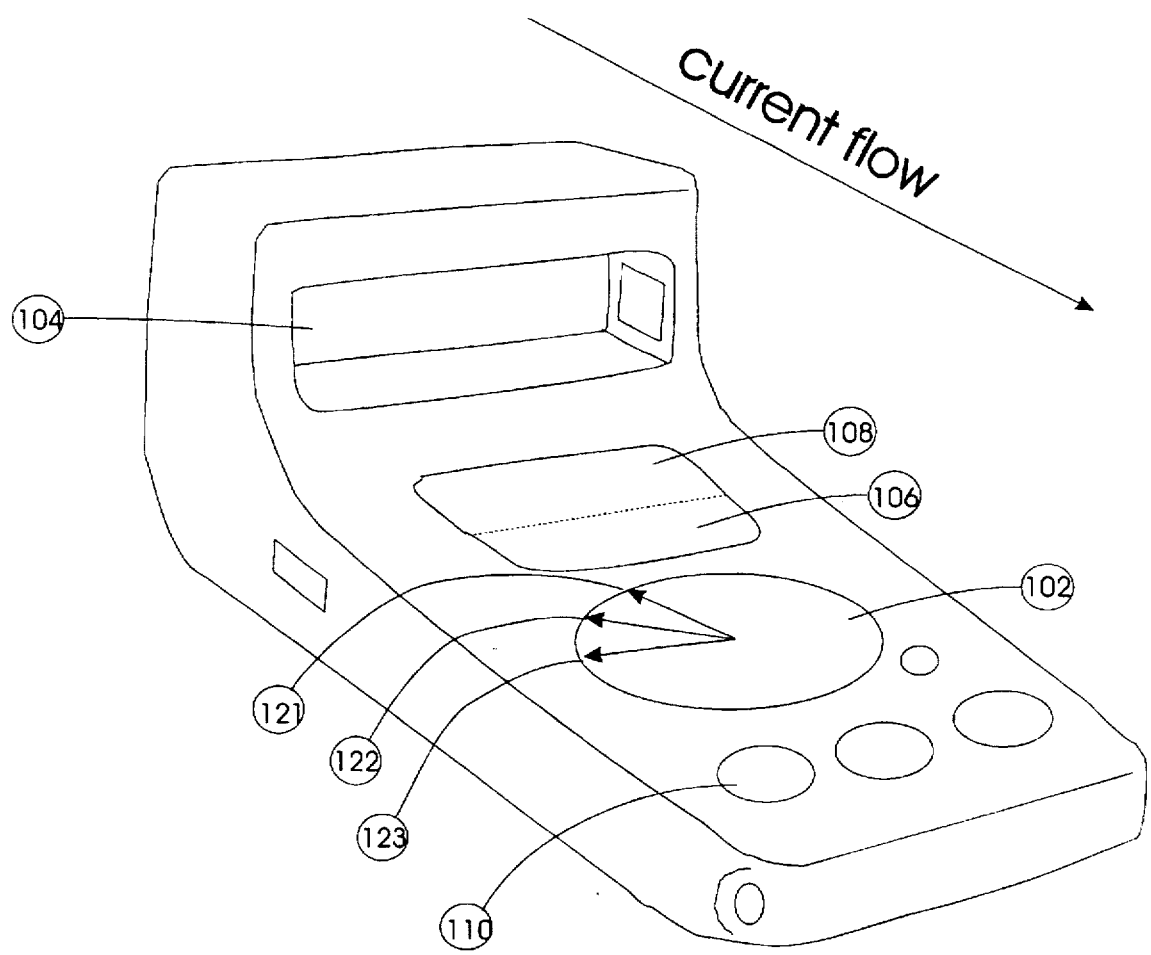
FIG. 7 is a simplified drawing of a housing for a navigation console according to the present invention.

An application of the flow meter in an underwater navigation console will now be described with reference to FIG. 7. An enclosure is provided with a handle. On a display portion of the enclosure is a compass 102, a chronometer 106 and a flow display 108. An inlet 104 at a front end of the enclosure allows water to pass therethrough and contains the coils and the sensors for use in fluid flow measurement. Flow measurement readings are displayed on the flow display 108. A diver can, through input means 110 in the form of knobs and buttons enter the speed and direction of current, the desired direction of travel, and diver swim speed. A processor means within the enclosure calculates and displays a preferred direction for travel 121 on the compass display along with the desired direction 122 and an indication of absolute direction in the form of an arrow pointing north 123.

The console will now be described in operation referring to FIG. 8. The flow diagram is for console use and reflects one method of using same. A diver wishing to use the console for navigation, enters the water with the console. The diver selects current flow entry using the input means 110. A stationary object is located and the diver maintains a fixed position and points the console into the current. An actuating button is pressed to measure current flow. The current flow is shown on the flow display 108 and the current direction (read immediately before and after the flow measurement and compared for correctness) is displayed on the compass. When acceptable, the diver accepts the values. Alternatively, the diver discards the values and measures the current flow again. The diver selects diver speed entry. The diver again points the console into the current and swims into the current. A measurement of the diver's relative speed is performed by the console. Alternatively, the diver can face in any direction and the relative speed reading should be substantially the same. When desirable, this measurement is also accepted. The flow display can now display current speed or diver speed. The compass shows North or another predetermined direction. The diver now enters a direction, and optionally distance to travel. The processor means calculates an approximate direction in which the diver should swim in order to reach the desired destination.

Figure 8:
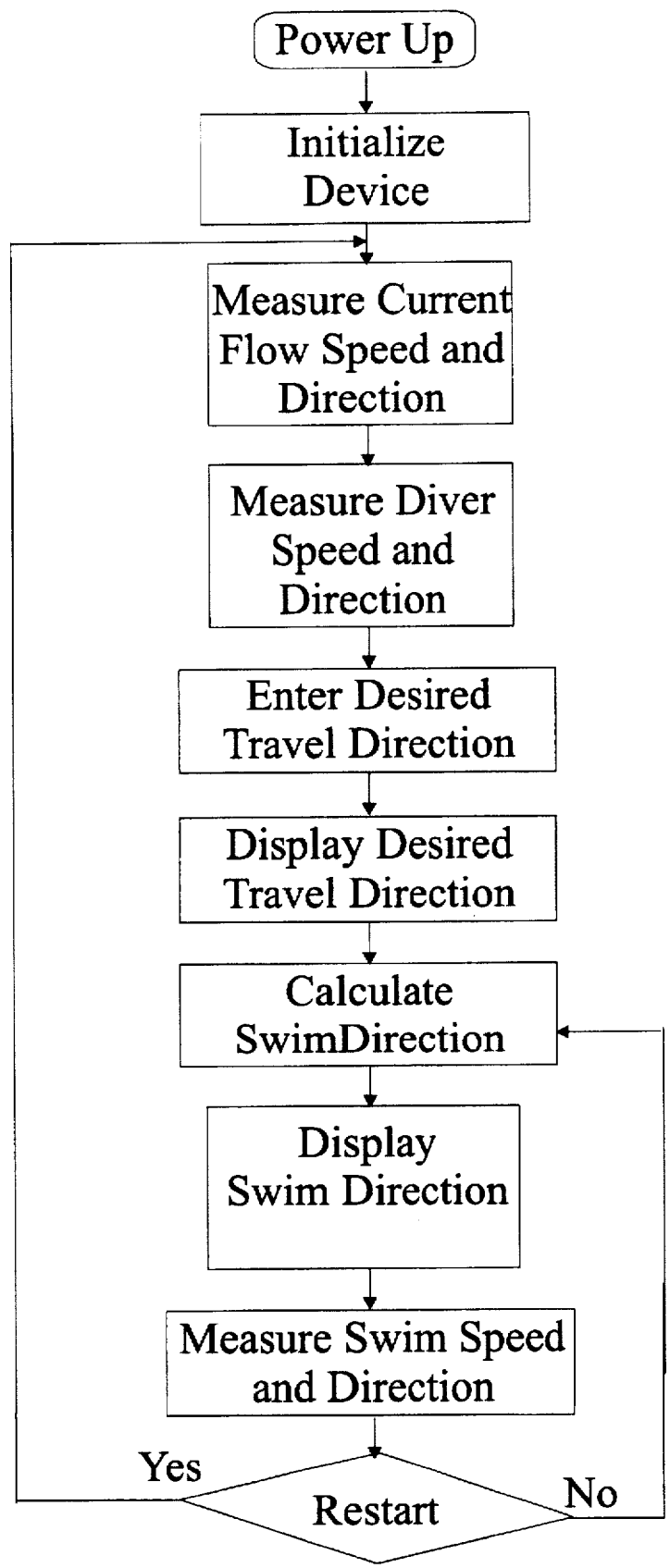
FIG. 8 is a flow diagram indicating a method of using a navigation console according to the invention.

Alternatively as shown in FIG. 8, the console dynamically calculates location based on compass, chronometer, and fluid flow through the inlet. Using such a method, the flow meter must be isolated from the compass for example by placing the compass measuring circuit distant from the flow meter. Alternatively, the flow meter can be cycled on and off and alternately, the processor means can read the compass and the flow speed extrapolating between cycles. The latter will only approximate navigation, but as no navigation tools currently exist that simplify navigation to this degree, even an estimate of location is desirable.

Figure 9:
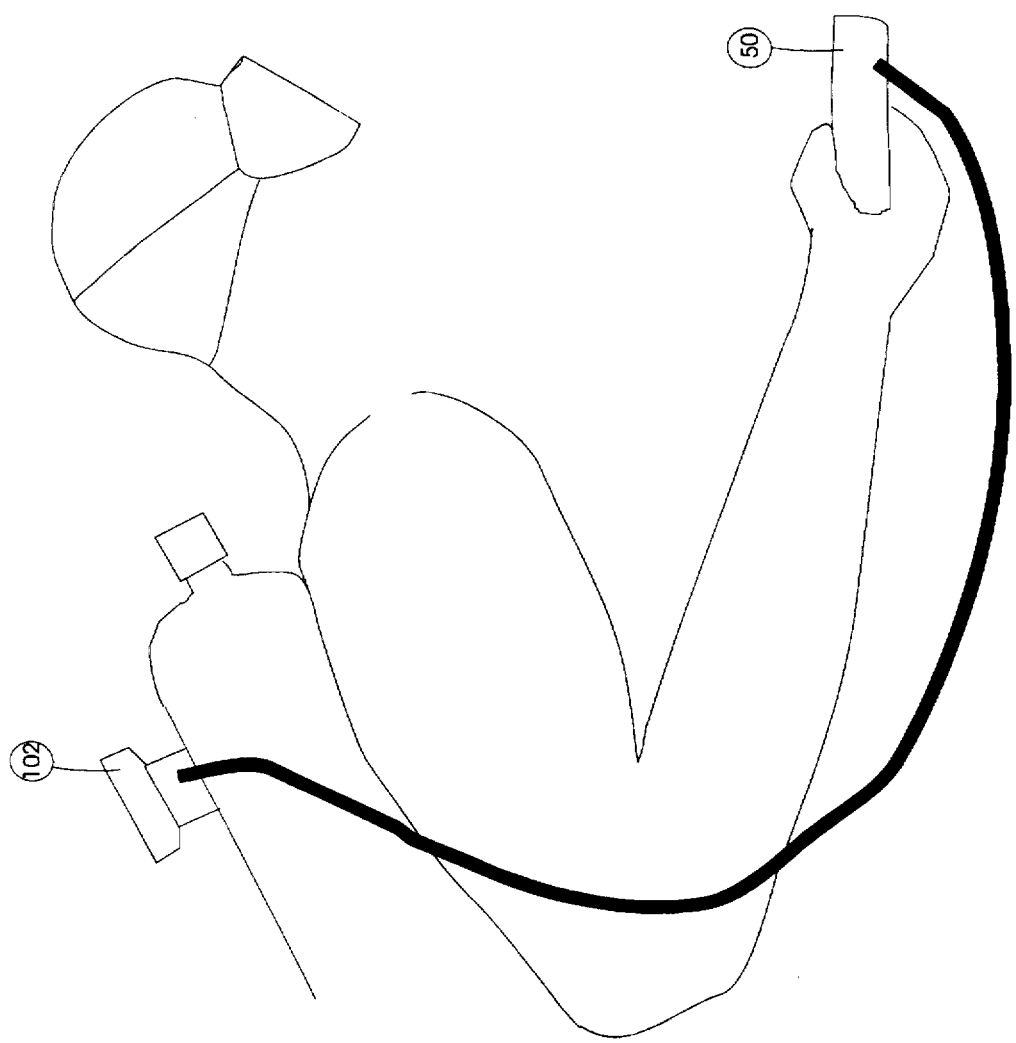
FIG. 9 is a drawing of a diver with a navigation console according to the invention in which a first portion of the navigation console is disposed remotely for a second portion thereof.

Referring to FIG. 9, an embodiment wherein the compass 102 is distant to the flow meter 50 is shown. A compass 102 is disposed on the tank of a diver. Alternatively, the compass 102 is disposed on the belt, flippers, or other diving apparatus. The magnetic field of the flow meter is designed to minimize the affects on the compass 102. The compass is substantially unaffected by the flow meter magnetics in its location. The navigation console accepts directional and flow information at predetermined intervals or, alternatively, when changes occur. The information is used to calculate diver location and, for example, to display information indicative of the diver location to the diver at all times.

Alternatively, the navigation console calculates an approximate diver location and upon request, the console displays a suggested direction of swim so as to allow the diver to reach a predetermined destination. Such a request may be in the form of pressing a button. Alternatively, the flow meter employed in the navigation console measures flow in a plurality of orthogonal directions in order to more accurately calculate diver location. Further alternatively, the console is designed to be secured to the diver in a manner that allows substantially accurate calculations while minimizing any interference to a divers natural motions and hydrodynamics.

Any submersible portable flow meter that does not interfere with compass operation can be used in a navigation console as herein described. One advantage of the flow meter described herein is that it is a sealed unit without moving parts.

Figure 10A:
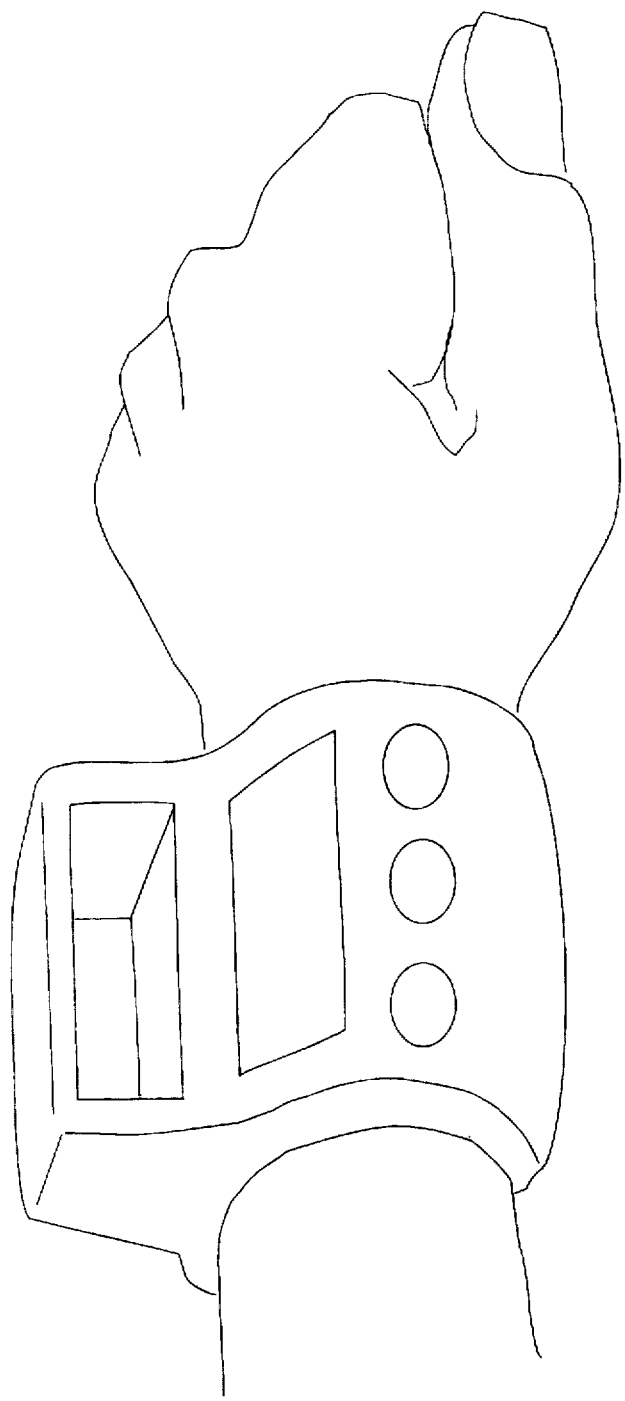
FIG. 10a and FIG. 10b are drawings of a diver's watch including an embodiment of the present invention therein.
Figure 10B:
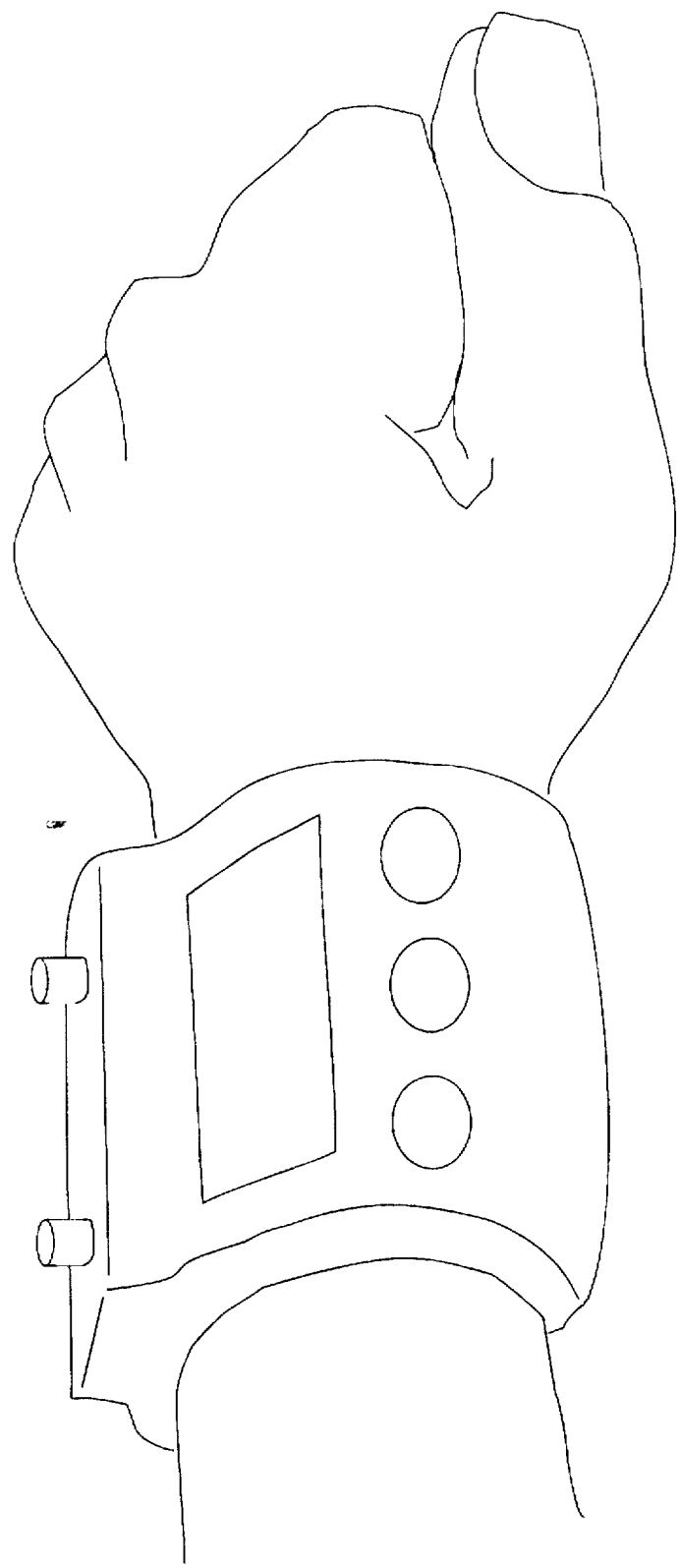

An underwater navigation console or a flow meter according to the present invention may be incorporated into other diving equipment. In FIGS. 10a and 10b, the invention is incorporated into a diver's watch. FIG. 10a shows a configuration of a flow meter 1 having two coils. FIG. 10b shows a configuration of a flow meter 1 having a single coil. A flow meter according to the present invention could also be incorporated into a diver's mask wherein the transparent portion of the mask also acts as a display onto which results are projected. This functions similar to head up displays for automobiles and is well known in the design of automobile dashboard systems.

In an embodiment, the switch is electronically controlled and is actuated by the microprocessor within the device.

Numerous other embodiments may be envisaged without departing from the spirit and scope of the invention.

What I claim is:

1. A portable device for measuring fluid flow of a conductive fluid and for assisting navigation of a diver comprising:
    a) a waterproof housing;
    b) a DC power supply for providing power to the device disposed within the housing;
    c) a coil disposed within the housing to allow the conductive fluid outside the housing to flow proximate the coil on at least a side thereof for generating a measurable field;
    d) a switch for providing DC power from the power supply to the coil in a first mode of operation and for preventing DC power from being supplied to the coil in a second mode of operation;
    e) a first conducting sensor and a second conducting sensor disposed outside the housing for sensing the measurable field and for providing a first signal and a second signal, respectively, corresponding to the sensed measurable field;
    f) measuring means coupled to receive the first signal and the second signal and for determining a measurement of fluid flow rate in dependence upon at least an aspect of the first signal and the second signal and for providing a third signal in dependence upon the measurement; and
    g) display means for displaying information indicative of fluid flow rate in dependence upon the third signal.

2. A portable device for measuring fluid flow and for assisting navigation of a diver as defined in claim 1 further comprising a second coil disposed within the housing to allow the conductive fluid outside the housing to flow proximate the second coil on at least a side thereof for contributing to the measurable field.

3. A portable device for measuring fluid flow and for assisting navigation of a diver as defined in claim 2 wherein the waterproof housing forms an opening having an aft end and a fore end, the fore end in fluid communication with the aft end and wherein the two coils are disposed within the waterproof housing on different sides of the opening to allow water, outside the housing, to flow therebetween.

4. A portable device for measuring fluid flow and for assisting navigation of a diver as defined in claim 3 wherein the coils are connected in series.

5. A portable device for measuring fluid flow and for assisting navigation of a diver as defined in claim 1 wherein the fluid is water.

6. A portable device for measuring fluid flow and for assisting navigation of a diver as defined in claim 1 wherein the waterproof housing including the circuitry therein has an overall density substantially the same as water.

7. A portable device for measuring fluid flow and for assisting navigation of a diver as defined in claim 1 wherein the switch is electronically activated by the measuring means.

8. A portable device for measuring fluid flow and for assisting navigation of a diver as defined in claim 1 wherein the power supply is a 9 volt battery.

9. A portable device for measuring fluid flow and for assisting navigation of a diver as defined in claim 1 wherein the measuring means comprises a differential amplifier for amplifying a difference between the first signal and the second signal and for providing an amplified signal; an analogue to digital converter for converting the amplified signal into a digital value; and a processor for converting the digital value into a measurement of fluid flow.

10. A portable device for measuring fluid flow and for assisting navigation of a diver as defined in claim 9 wherein the measuring means further comprises a memory means containing a look up table for converting the digital value to a measurement of fluid flow.

11. A portable device for measuring fluid flow and for assisting navigation of a diver as defined in claim 9 further comprising means for measuring time and means for multiplying a measured time and a measured flow rate.

12. A portable device for measuring fluid flow and for assisting navigation of a diver as defined in claim 1 further comprising means for measuring time and means for multiplying a measured time and a measured flow rate.

13. A portable device for measuring fluid flow and for assisting navigation of a diver as defined in claim 1 further comprising:
    g) a compass for determining an orientation of the device and for providing a fourth signal; and
    h) a processor means for receiving the third signal and the fourth signal and for providing a fifth signal in dependence upon both the third signal and the fourth signal to the display means;
    wherein the display means also displays information in dependence upon the fifth signal.

14. A portable device for measuring fluid flow and for assisting navigation of a diver as defined in claim 13 further comprising means for storing information in dependence upon the third signal and the fourth signal.

15. A portable device for measuring fluid flow and for assisting navigation of a diver as defined in claim 14 wherein the means for storing information in dependence upon the third signal and the fourth signal is for storing information relating to water current, current direction, and diver speed.

16. A portable device for measuring fluid flow and for assisting navigation of a diver as defined in claim 15 wherein the processor means is for calculating a direction in which a diver is to swim in order to substantially reach a predetermined destination from a predetermined origin and for providing the fifth signal in dependence upon the calculated direction.

17. A portable device for measuring fluid flow and for assisting navigation of a diver as defined in claim 13 further comprising means for storing information in dependence upon the third signal, the fourth signal and the fifth signal relating to water current, current direction, diver speed, diver direction, and past measured and calculated values; wherein the processor means is for receiving the third signal and the fourth signal and for calculating an approximate location for the diver in dependence upon the third and fourth signals and stored information; and wherein the fifth signal is provided in dependence upon the third and fourth signals and the calculated approximate location to the display means.

18. A portable device for measuring fluid flow and for assisting navigation of a diver as defined in claim 13 further comprising means for storing information in dependence upon the third signal, the fourth signal and the fifth signal relating to water current, current direction, diver speed, diver direction, predetermined destination, and past measured and calculated values; wherein the processor means is for receiving the third signal and the fourth signal and for calculating an approximate location for the diver and an estimated direction of travel for the diver in dependence upon the third and fourth signals and stored information; and wherein the fifth signal is provided in dependence upon the third and fourth signals and the estimated direction of travel to the display means.

19. A portable device for measuring fluid flow and for assisting navigation of a diver comprising:
   a) a substantially waterproof housing having a handle portion and a tube portion having an aft end and a fore end in fluid communications, the tube portion for accepting conductive fluid at the fore end thereof and for allowing the fluid to pass through the tube portion and exit at an aft end thereof;
   b) a DC power supply disposed within the housing and for providing power to the device;
   c) a pair of coils disposed on different sides of the tube portion of the housing between the aft end and the fore end thereof for allowing fluid outside the housing to pass therebetween, said coil and said fluid for generating a measurable field;
   d) a switch for providing power from the power supply to the pair of coils in a first mode of operation and for preventing power from being supplied to the pair of coils in a second mode of operation;
   e) a first conducting sensor and a second conducting sensor disposed outside the housing for sensing the measurable field within fluid passing outside the housing proximate the coils and for providing a first signal and a second signal, respectively, corresponding to the sensed measurable field;
   f) measuring means coupled to receive the first signal and the second signal and for determining a measurement of fluid flow rate in dependence upon at least an aspect of the first and second signals and for providing a third signal in dependence upon the measurement; and
   g) display means for displaying information indicative of fluid flow rate in dependence upon the third signal.

* * * * *